United States Patent [19]

Kincheloe

[11] Patent Number: 4,678,137
[45] Date of Patent: Jul. 7, 1987

[54] TAPE TRANSPORT APPARATUS

[76] Inventor: David W. Kincheloe, 417 North St., Graham, N.C. 27253

[21] Appl. No.: 595,405

[22] Filed: Mar. 30, 1984

[51] Int. Cl.$^4$ .............................................. G11B 15/32
[52] U.S. Cl. .................................................. 242/192
[58] Field of Search ............... 242/192, 195, 199, 200;
360/90, 93, 94, 95, 96.1, 96.3, 96.4, 132;
226/190–192, 91, 92

[56] References Cited

U.S. PATENT DOCUMENTS

| | | | |
|---|---|---|---|
| 2,891,736 | 6/1959 | Blaes | 242/192 |
| 3,808,902 | 5/1974 | Grant | 360/90 |
| 3,829,040 | 6/1973 | Nelson | 242/199 |
| 3,942,743 | 3/1976 | Jinsenji | 242/192 |
| 3,974,982 | 8/1976 | Stone | 242/192 |
| 4,335,857 | 6/1982 | Pfost et al. | 242/192 |

Primary Examiner—John M. Jillions

[57] ABSTRACT

A tape transport apparatus for delivering a tape at high speed and under a constant tension within a precise plane of tape travel comprises:
(a) a rotatably mounted tape supply;
(b) a rotatably mounted tape take-up;
(c) a first moving rim drive belt cooperating with the take-up and including a guide for placing the moving tape onto the rim drive belt, the rim drive belt positioned to carry the moving tape to the tape take-up and apply it to the tape take-up;
(d) a drive for rotating the tape take-up;
(e) the guide comprising a roller having a crowned drive surface for centering the rim drive belt and the tape thereon during rotation thereof in the tape winding plane of the tape take-up for applying the tape precisely within the desired plane; and
(f) a tape tensioning device for maintaining constant, predetermined tension on the tape, said tape tensioning device rotating the tape take-up at a predetermined, slightly faster surface speed than the speed at which the tape is being supplied thereto from the tape supply.

9 Claims, 10 Drawing Figures

TAPE TRANSPORT APPARATUS

TECHNICAL FIELD AND BACKGROUND OF THE INVENTION

This invention relates to a tape transport apparatus for delivering tape and similar products at high speed and under a constant tension within a precise plane of travel. The particular embodiment disclosed herein is a tape duplicator slave of the type used to make numerous copies of an audio tape from a master tape. However, the method and apparatus disclosed in this application also has a potential for utilization in any open reel or open pancake tape transport system, audio cassette duplication, tape slitting, video or audio cassette loading.

Numerous systems are known and are in present use for duplicating audio tape at high speed. Present known systems use capstans with pressure rollers and separate motors to turn the supply and take-up hubs. This necessitates having a sensor or sensor(s) in the tape path to monitor tape tension and in some way control the torque or speed of the supply and/or take-up hub to keep all of the operating criteria within acceptable limits. For this reason, many present systems are cumbersome, complicated, in constant need of adjustment and costly to manufacture.

Other systems attempt to minimize expense by making no provision whatsoever for monitoring tape tension. However, simplicity is achieved at the cost of uncontrolled starts, stretched tape and poor playback quality of recordings.

These problems are particularly difficult to correct when winding "pancakes". The term "pancakes" is a term of art in the recording industry and refers to a package of wound tape which has a relatively small core around which is wound a single width of relatively narrow tape. The extreme width of the package in comparison with its thickness causes it to resemble a thin round disk-like object such as a dinner plate or a pancake. This term will be used frequently throughout this application and when so used refers to the object described immediately above.

Because of the extreme width of a pancake in comparison with its depth, each layer of tape must be laid precisely on top of the underlying layer. Otherwise, the tape will not unwind properly and, if not handled with extreme care, separate, causing the entire package to be ruined. When properly wound, a pancake can be grasped on its outer edge and held between the thumb and forefinger without any layer of tape moving relative to any other layer.

Known take-up pancake packing systems provide quality which varies within great extremes depending on the tape speed, type of tape or tension under which the tape is optimally wound.

Another disadvantage of present tape packing systems is the tape guides which guide the successive layers of tape onto the take-up package. Present tape guides are often flat across the tape. When the guide is a roller guide, the tape will tend to be skewed to one side or the other. Because of the flexible nature of the tape, it is difficult to guide by its edges. Yet, known systems attempt to guide the tape onto the take-up package in precisely this manner.

Therefore, it is an object of the present invention to provide an apparatus and method for transporting tape which permits delivery of the tape at high speed and under a constant tension within a precise plane of tape travel.

It is another object of the present invention to provide an apparatus and method for transporting tape which treats the tape like a flat belt and guides it with crowned rollers.

It is another object of the present invention to provide a tape transport apparatus which treats the tape as a flat belt which is wound with a driving belt which is narrower than the tape itself.

These and other objects and advantages of the present invention are achieved in the preferred embodiment of the method and apparatus described below by providing tape transport apparatus comprising a rotatably mounted tape supply, a rotatably mounted tape take-up and a rim drive belt cooperating with the tape take-up and including a guide for placing the moving tape on a moving rim drive belt. The rim drive belt is positioned to carry the moving tape to the tape take-up and apply it to the tape take-up.

Drive means are provided for rotating the tape take-up.

According to one embodiment of the invention, the guide comprises a roller having crowned drive surface for centering the rim drive belt and the tape thereon during rotation in the tape winding plane of the tape take-up for applying the tape precisely within the desired plane.

According to one embodiment of the invention, tape tensioning means are provided for maintaining a constant pre-determined tension on the tape. The tape tensioning means is adapted to rotate the tape take-up at a pre-determined slightly faster surface speed than the speed at which the tape is being supplied thereto from the tape supply.

According to one embodiment of the invention, the tape transport apparatus includes a second rim drive belt driven by the drive and cooperating with the tape supply for taking the moving tape from the tape supply and placing the moving tape onto a second rim drive belt. The rim drive belt is positioned to carry the tape from the tape supply and maintain the tape in a precise plane for subsequent delivery to the tape take-up. The second guide comprises a roller having a crown surface for centering the rim drive belt in the tape winding plane of the tape supply.

Preferably, the apparatus includes a pressure control for moving the center of rotation of the tape supply and the tape take-up as tape transport occurs to maintain contact and constant pressure between the tape supply and tape take-up, respectively, and the rim drive belt.

The method according to the present invention includes providing a rim drive belt in rim drive relation to a take-up package, applying tape from the supply package to a rim drive belt, centering the rim drive belt in the tape winding plane of the take-up package by means of a guide roller having a crowned drive surface, delivering the tape to the rim of the take-up package on the surface of the rim drive belt, driving the take-up package by rim surface contact with the drive belt, and applying the tape from the rim drive belt onto the take-up package.

According to one embodiment of the method, the rim drive belt to which the tape is applied, contacts the tape only between its two edges.

Preferably, the method includes the additional steps of providing a rim drive belt in rim drive relation to the supply package and delivering tape from the supply package to the rim drive belt.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
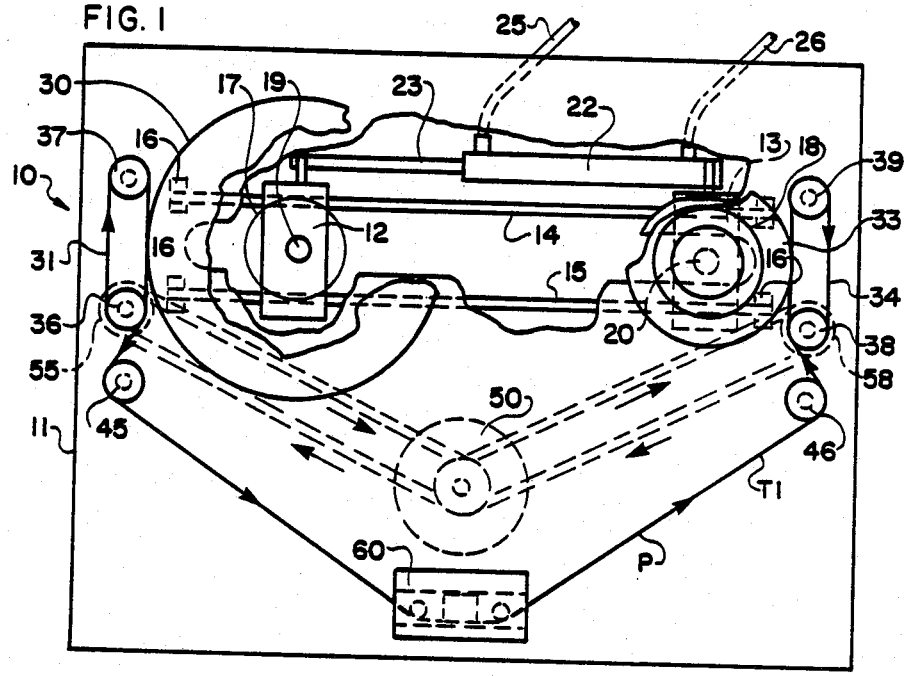
FIG. 1 is a top plan view of a tape winding apparatus according to this invention, with parts broken away.
Figure 2:
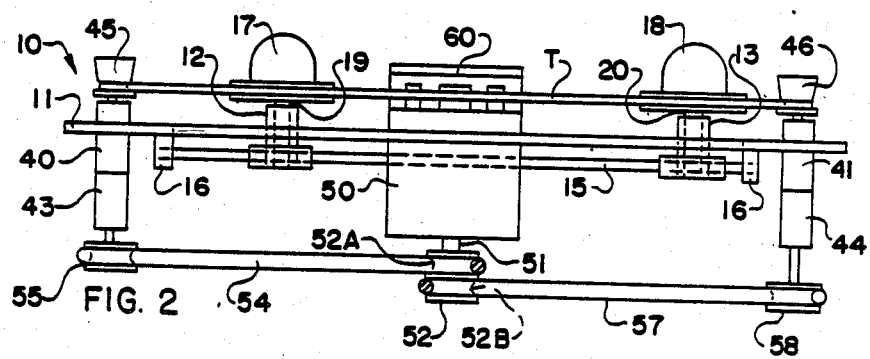
FIG. 2 is a side elevational view of the tape transport apparatus shown in FIG. 1.
Figure 3:
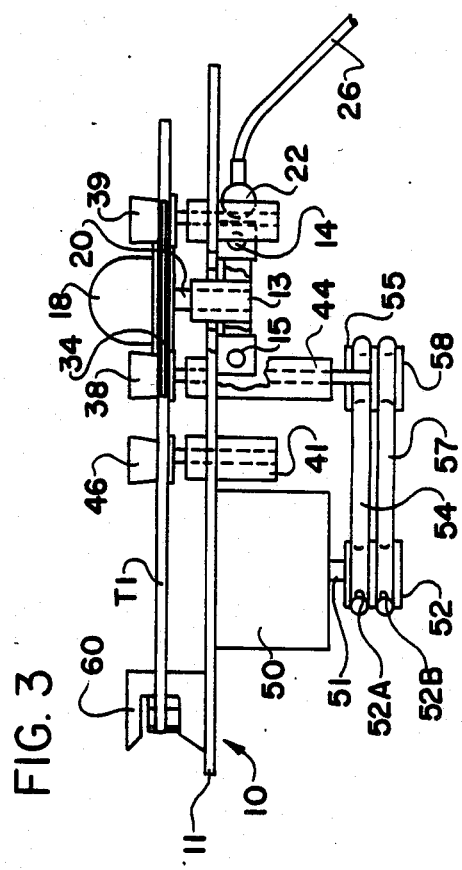
FIG. 3 is a side view 90° to that shown in FIG. 2.

Referring now to FIGS. 1, 2 and 3 of the drawings, three views of a unidirectional tape winder are shown. By unidirectional is meant an apparatus in which the tape can only be moved in one direction. The particular embodiment disclosed in FIGS. 1, 2 and 3 is a slaved pancake winder.

Referring now specifically to FIG. 1, a slaved pancake winder 10 according to the present invention is shown. Winder 10 comprises a main base plate 11 on which are mounted two movable platforms 12 and 13. Platforms 12 and 13 are free to move side-to-side on a pair of spaced-apart rods 14 and 15. Rods 14 and 15 are mounted on spaced-apart rod hangers 16.

Mounted on platforms 12 and 13, respectively, are hubs 17 and 18 which are mounted respectively on hub axles 19 and 20.

Platforms 12 and 13 are free to move along rods 14 and 15 under the control of an air cylinder 22 which extends or retracts a piston rod 23. Cylinder 22 is controlled by compressed air which is supplied through control hoses 25 and 26 which, respectively, retract and extend piston rod 23. As is best shown in FIG. 1, one end of cylinder 22 is mounted on movable platform 13 and the outwardly extending, free end of piston rod 23 is mounted on platform 12.

Therefore, outward pressure is supplied by cylinder 22 and in operating position a supply pancake of tape 30 is pressed against a flat supply pancake drive belt 31 and a take-up package 33 is pressed against a flat take-up pancake drive belt 34.

When air pressure is released from cylinder hose 26 and is applied to cylinder hose 25, movable platforms 12 and 13 move together, releasing packages 30 and 33 from contact with flat drive belts 31 and 34.

Supply package drive belt 31 is mounted for rotation around a driving pulley 36 and a spaced-apart idler pulley 37. Likewise, take-up drive belt 34 is mounted around a drive pulley 38 and an idler pulley 39. Drive pulleys 36 and 38 are mounted in bearing holders 43 and 44, respectively.

A pair of tape guides 45 and 46 are mounted in front of drive pulleys 36 and 38, respectively, and are respectively mounted in bearing holders 40 and 41. Motor 50 drives a motor shaft 51 to which is connected a drive pulley 52 which has two grooves, a supply groove 52a and a take-up groove 52b. Supply groove 52a is approximately 2% smaller in diameter than the take-up groove 52b for reasons which will be explained in further detail below. A drive belt 54 interconnects pulley 52 (groove 52a) with a driven pulley 55 which in turn rotates drive pulley 36. A round drive belt 57 is positioned around pulley 52 (groove 52b) and a take-up driven pulley 58 which in turn rotates take-up drive pulley 38. Pulleys 58 and 55 are equal in diameter. A record head 60 is positioned between and forward of the drive pulleys 36 and 38. A tape path "P1" is defined by the tape "T1" from supply package 30 around tape guide 45 across record head 60 around tape guide 46 and onto the take-up package 33.

Figure 4:
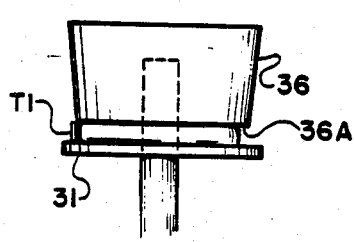
FIG. 4 is a side elevational view of a crowned flat belt driving pulley according to one embodiment of the invention.

Referring now to FIG. 4, tape guide 36 is provided with a groove 36a of a reduced diameter. Groove 36a defines a convex inner surface which forms a crowned driving surface for the tape. The significance of this structure is described below.

By virtue of the structure described above, the unidirectional tape winder 10 shown in FIG. 1 is a "rim belt driver." All of the tension on the tape "T" and all of the driving force for the winder is derived by direct contact with the tape by belts 31 and 34. No drive turns supply hub 17 and no drive turns the take-up hub 18. Rather, belt 31 drives the supply package 30 by direct contact with the outer layer of tape on the package by means of counterclockwise rotation. Likewise, drive belt 34 drives take-up package 33 in a clockwise direction meaning, as indicated, that the direction of tape movement and the tape path is as shown in FIG. 1 with the tape moving from the supply package 30 to the take-up package 33.

Because groove 52a of pulley 52 is slightly smaller in diameter than the take-up groove 52b, the two round belt driven pulleys are moved at slightly different rates of speed. Pulley 58 rotates slightly faster than pulley 55. It is this slightly faster rotation which adds tension to the tape in an exact and precise manner. The ratio is directly proportional to the diametrical ratio of the supply pulley groove 52a to the take-up groove 52b. For audio cassette tape which is 0.150 inches wide, this ratio should be approximately 1:1.02.

Because cylinder 22 applies pressure outwardly to movable platforms 12 and 13, the edges of supply package 30 and take-up package 33 are pressed against the edges of the drive belts 31 and 34, respectively. If contact is maintained, the belts will drive the tape as well as the supply package 30 and take-up package 33. As described above, the tape is taken up slightly faster than it is supplied, thereby causing the tape to be under tension as it moves across record head 60. As can be seen, a number of adjustments and other variables have been eliminated permitting very precise control of the winding speed. Likewise, means have been provided in the drive pulleys 36 and 38 to very precisely maintain the tape in a single plane as it is removed from the supply package 30 and applied to take-up package 33.

Specifically, as the tape passes around drive pulley 36 it is guided onto the center of pulley 36 by the crown in groove 36a, as is described above with reference to FIG. 4. Exactly the same crown is present on pulley 38 and for this reason the tape is guided onto the center of the crown as it passes across the recording head and moves toward take-up package 33. As the tape and belt leave the take-up pulley 38, the tape remains in contact with the belt 34 until it is applied to the take-up package 33. Since the belt 34 is substantially narrower than the tape, the edges of the tape remain free from potentially damaging contact. The tape is driven solely by contact between its two edges. This continued contact with belt 34 keeps the tape exactly in the ideal tape path and prevents it from being skewed to one side or the other. As the tape contacts take-up package 33, it remains in its centered, ideal plane, again, because belt 34 is narrower than the tape. This causes the belt 34 to continue acting like a crown pulley.

Another substantial advantage is achieved in winding tape in this manner. As described above, air cylinder 22 forces supply package 30 and take-up package 33 against their respective belts 31 and 34. This pressure squeezes air from between the successive layers of tape which are applied to take-up package 33 in a single plane. As a result, a firmly packed pancake is formed which can be handled without fear of causing one layer of tape to move laterally relative to an adjacent layer, causing the package to come unwound. The packing pressure is easily controlled by adjusting the pressure in cylinder 22. The tension on the tape is controlled by adjusting the ratio of the diameter of the two grooves 52a and 52b of drive pulley 52, as described above. As can be clearly seen, the tension on the tape and the pressure exerted on the rolls in delivering and winding the tape are completely independent, meaning that far more precise adjustment of the winding characteristics of the winder is possible without affecting other characteristics.

Figure 5:
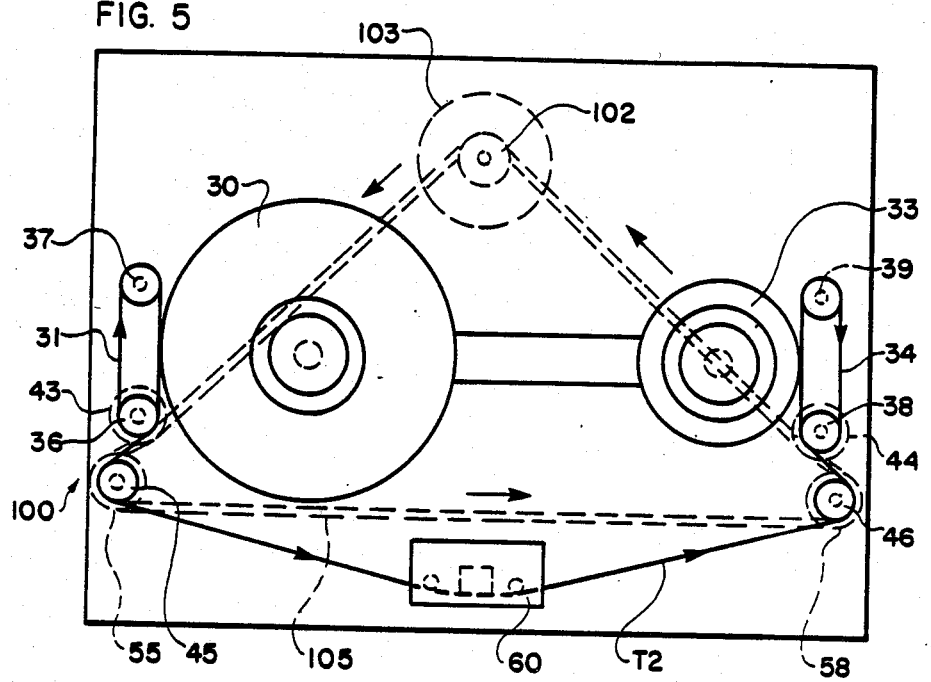
FIG. 5 is a tape transport system which is bi-directional.

Referring now to FIG. 5, a bidirectional rim tape winder is broadly indicated at reference numeral 100. In this system the tape "T2" can be wound in either direction, as desired. Bidirectional winder 100 is substantially similar in many respects to the unidirectional winder 10 in FIG. 1 and for this reason the various common elements are identified by like reference numerals. The basic difference in the bidirectional winder 100 is the presence of a single groove drive pulley 102 mounted on a bidirectional motor 103. An endless drive belt 105 is positioned around motor pulley 102, pulley 55 and pulley 58 and engages and drives pulleys 43 and 44. In so doing, belt 105 rotates drive pulley 36 and belt 31 in a clockwise direction which, in turn, rotates supply package 30 in a counterclockwise direction, thereby unwinding tape from supply package 30 and applying it to belt 31. The tape is centered on belt 31 as it passes around drive pulley 36. The tape is precisely centered on belt 31 and is then applied to tape guide 45. The tape is therefore in the exact plane necessary to properly pass across recording head 60 and defines a tape path "P2."

The tape then passes over tape guide 46 and is then applied to drive pulley 38 where it is again centered on the narrower belt 34. Belt 34 carries the tape directly onto take-up package 33.

Figure 6:
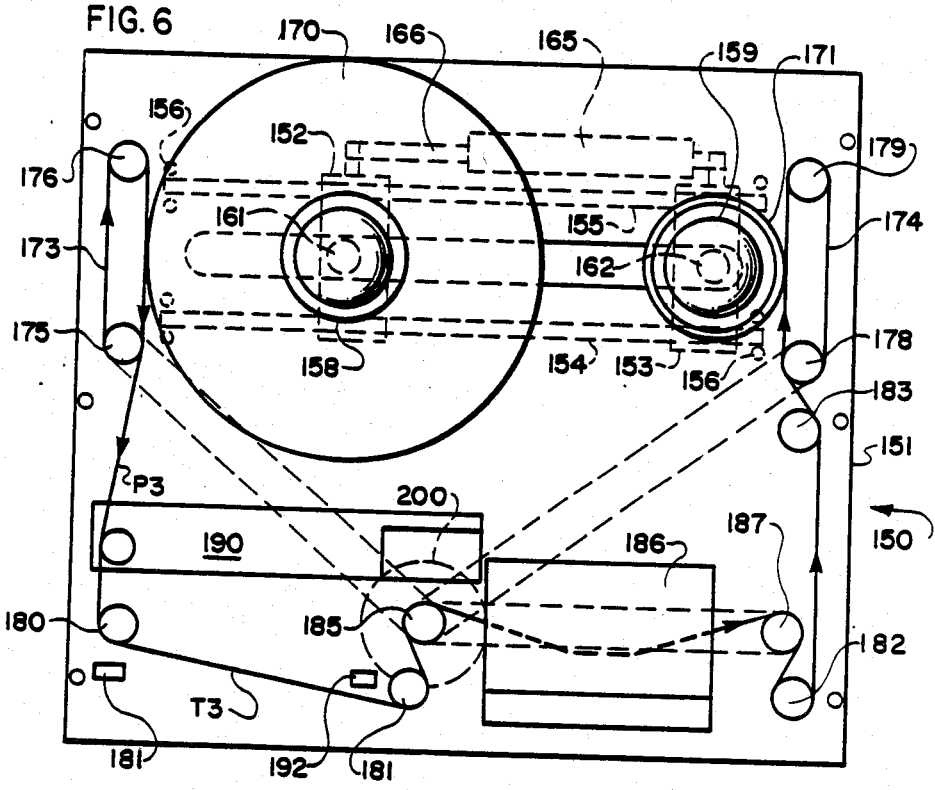
FIG. 6 is a tape transport apparatus according to the present invention which uses a rim drive belt on the supply and take-up pancakes in conjunction with dual capstans.
Figure 7:
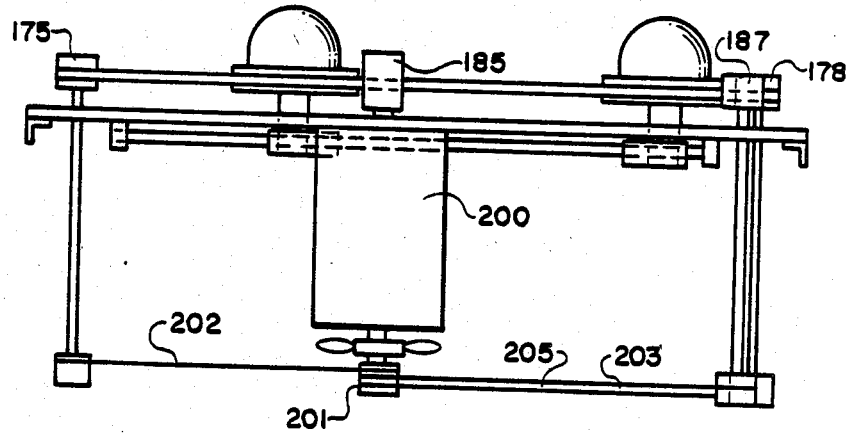
FIG. 7 is a vertical elevational view of the tape transport apparatus shown in FIG. 6.

Referring now to FIGS. 6 and 7, another embodiment of the tape winder is shown and is broadly designated at reference numeral 150. Winder 150 comprises a main base plate 151 on which is mounted two movable platforms 152 and 153. Platforms 152 and 153 are mounted on a pair of spaced-apart rods 154 and 155 which are mounted on spaced-apart rod hangers 156. Hubs 158 and 159 are mounted on platforms 152 and 153, respectively, and are rotated by hub axles 161 and 162.

Platforms 152 and 153 are controlled by an air cylinder 165 and a piston rod 166 in the same manner as is described above with reference to FIG. 1. A flat pancake supply package 170 is positioned on hub 158 and is wound onto a take-up package 171 on hub 159. In operating position, supply package 170 is pressed against a flat supply pancake drive belt 173 and the take-up package 171 is pressed against a flat take-up pancake drive belt 174, also in the manner described above with reference to FIG. 1.

Drive belt 173 is mounted for rotation around a drive pulley 175 and a spaced-apart idler pulley 176. Likewise, take-up drive belt 174 is mounted around a drive pulley 178 and an idler pulley 179. Four tape guides 180, 181, 182 and 183 are positioned on base plate 151 and guide tape "T3" past a tape cleaner assembly 190, "end of tape" optics 191 and 192, around a driver capstan 185, past tape recording and/or playback heads 186 and over a driven capstan 187. Tape is then transported by guide rollers 182 and 183 onto take-up driving pulley 178 where the tape is transported onto take-up package 171, defining a tape path "P3."

Figure 8:
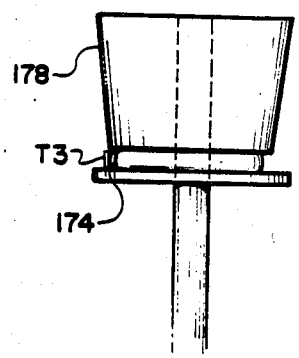
FIG. 8 is a crowned flat belt driving pulley according to another embodiment of the present invention.

Motor 200 rotates a two groove drive pulley 201 in the same manner as described above with reference to FIG. 1. Belts 202 and 203 drive drive pulleys 175 and 178, respectively, thereby removing tape from supply package 170 in a precise plane and transporting it to the take-up package 171 in the same precise plane. In addition, a belt 205 drives capstans 185 and 187. This ensures additional positive control of the tape tension and speed as it passes across the recording and/or playback heads 186. Drive pulley 178 is shown in FIG. 8 and has essentially the same construction as drive pulley 36 shown in FIG. 4. Note that in both cases the crowned tape driving surface causes belt 174 to be centered on the driving surface. Belt 174 is narrower than the tape being wound, which means that the tape can be properly controlled and centered without interfering with the edge of the tape.

Figure 9:
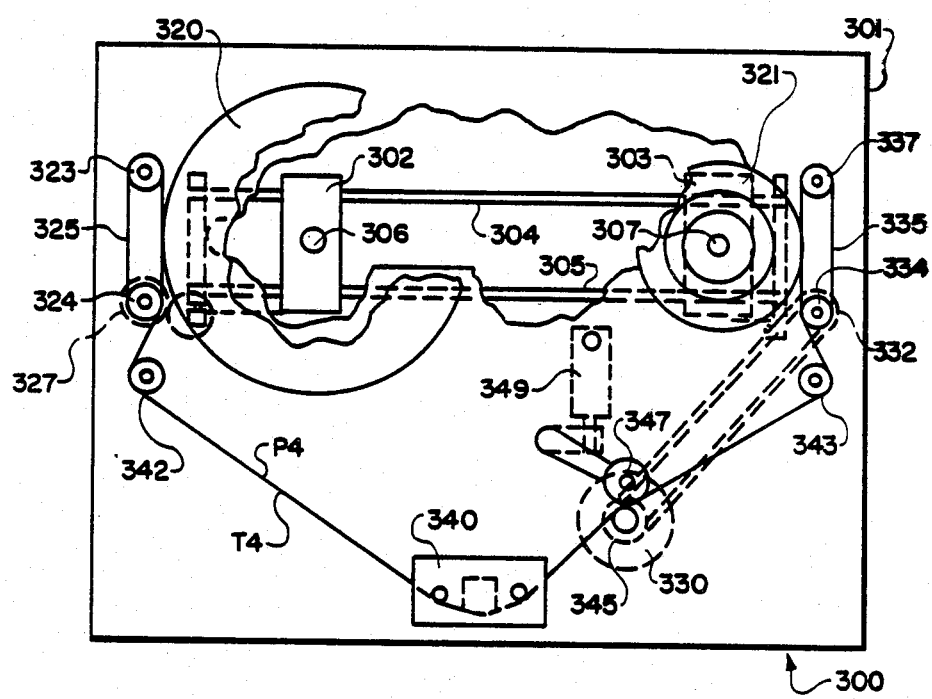
FIG. 9 is another embodiment of the tape transport apparatus which includes a hysteresis brake for achieving constant tension on the tape; and, FIG. 10 is a vertical, elevational view of the tape transport apparatus shown in FIG. 9.

Referring now to FIG. 9, yet another embodiment of a slaved pancake winder is shown and broadly indicated at reference numeral 300. The winder 300 includes a main base plate 301 on which are mounted a pair of spaced-apart guide rods 304 and 305. Two movable platforms 302 and 303 are mounted for sliding, side-to-side movement on guide rods 304 and 305. Hubs 306 and 307 are mounted on platforms 302 and 303, respectively.

Figure 10:
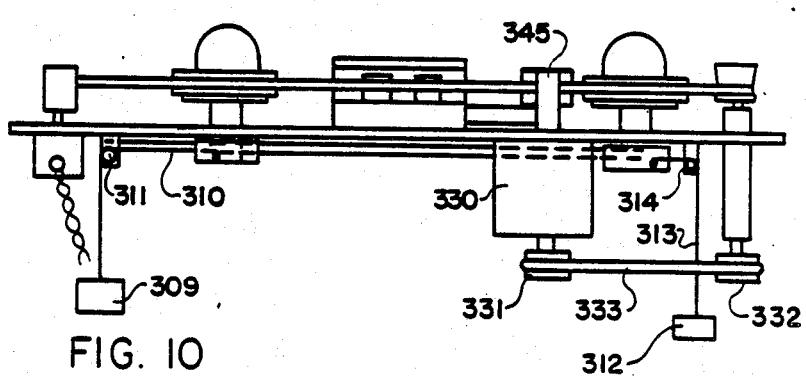

Referring now to FIG. 10, platform 302 is biased in the outward direction by means of a weight 309 which is connected to platform 302 by means of a cable 310 which passes over a pulley 311 connected to the underside of base plate 301. Likewise, platform 303 is urged in the opposite, outer direction by means of a weight 312 which is connected by a cable 313 to platform 303. The weight is also supported by a pulley 314 which is connected to the underside of main base plate 301.

Tape "T4" is taken from a supply package 320 and transported to a take-up package 321 and defines a tape path "P4." Positioned outboard of supply package 320 is an idler pulley 323 spaced apart from a drive pulley 324. Rotating around pulleys 323 and 324 is a flat supply drive belt 325. A hysteresis brake 327 is directly connected to pulley 324. Hysteresis brake 327 has a hold back torque effect which is proportional to the amount of DC current fed to it. This braking effect is constant regardless of speed. This is an ideal application for tape-winding because constant torque will give constant tape tension regardless of speed or size of the supply package 320. The size of the supply package 320 is not a factor because belt 325 acts on the perimeter of package 320 instead of on its center. Tape is wound onto take-up package 321 by means of a motor 330 positioned on the underside of base plate 301. A driver pulley 331 on motor 330 is connected to a driven pulley 332 by a belt 333. Pulley 332 is axially connected to and rotates a take-up drive pulley 334. A take-up drive belt 335 rotates between drive pulley 334 and a spaced-apart idler pulley 337. As is shown in FIG. 9, belt 335 rotates against the perimeter of take-up package 321 which is held against it by weight 312. Tape "T4" is applied to belt 335 and as belt 335 moves against the perimeter of rotating take-up package 321, tape "T4" is applied in a precise plane thereto. Winder 300 includes a record and/or playback head 340. Tape "T4" is transported from supply package 320 to take-up package 321 past record head 340 by means of guide rollers 342 and 343. In order to provide further tape speed control, a capstan 345 driven off of motor 330, and a pinch roller 347, are provided between head 340 and take-up package 321. Pinch roller 347 is activated by an air cylinder assembly 349 and can be adjusted as desired.

Referring now again to all of the embodiments shown in FIGS. 1 through 10, a wide variation in operating characteristics and techniques is possible. For example, the supply drive belt which takes tape off of the supply package is ordinarily somewhat wider than the take-up drive belt which applies tape to the take-up package. The extra width on the supply package side is intended to accommodate poorly wound pancakes which might wobble while they are turning. Since the tape is applied to the take-up package in a very precise plane, the tape on that side can be substantially narrower. In fact, as described above, the take-up drive belt is narrower than the tape it is winding so that the tape is controlled without manipulating its edges.

In the embodiment shown in FIG. 9, the weights 309 and 312 offer the advantage of less expense and also permit the pressure on supply package 320 to be controlled independent of the pressure on take-up package 321. The pressure can be changed easily by adding or subtracting weights. It has also been determined that winder 300 is much easier to thread when supply package 320 and take-up package 321 are controlled independently.

Several embodiments of an apparatus and method for winding tape are described above. Various details of the invention may be changed without departing from its scope. Furthermore, the foregoing description of several preferred embodiments of the apparatus and method according to the present invention is provided for the purpose of illustration only and not for the purpose of limitation—the invention being defined by the claims.

I claim:

1. A tape transport apparatus for delivering a tape at high speed and under a constant tension within a precise plane of tape travel, comprising:

(a) a rotatably mounted tape supply means;

(b) a rotatably mounted tape take-up means;

(c) a first moving rim drive belt cooperating with said take-up means and including a guide for placing the moving tape onto said rim drive belt, said rim drive belt positioned to carry the moving tape to the tape take-up means and apply it to the tape take-up means;

(d) drive means for rotating said tape take-up means;

(e) said guide comprising a roller having a crowned drive surface for centering the rim drive belt and the tape thereon during rotation thereof in the tape winding plane of the tape take-up means for applying the tape precisely within the desired plane; and (f) tape tensioning means for maintaining constant, predetermined tension on the tape, said tape tensioning means rotating said tape take-up means at a pre-determined, slightly faster surface speed than the speed at which the tape is being supplied thereto from said tape supply means.

2. A tape transport apparatus according to claim 1 and including a second rim drive belt driven by said drive means and cooperating with said tape supply means and including a second guide for taking the moving tape from the tape supply means and placing the moving tape onto said second rim drive belt, said rim drive belt positioned to carry the tape from the tape supply means and maintain the tape in a precise plane for subsequent delivery to said tape take-up means; said second guide comprising a roller having a crowned drive surface for centering the rim drive belt during rotation thereof in the tape winding plane of the tape supply means.

3. A tape transport apparatus according to claim 2 wherein the first rim drive belt and said second rim drive belt are each narrower than the tape to be wound for driving the tape intermediate its opposing edges.

4. A tape transport apparatus according to claim 2 wherein said drive means comprises a single drive motor driving said first rim drive belt and said second rim drive belt by means of separate, first and second drive belts.

5. A tape transport apparatus according to claim 1, and further including a second rim drive belt, wherein said drive means comprises a single drive motor driving a single drive belt which rotates both said first rim drive belt and said second rim drive belt.

6. A tape transport apparatus according to claim 5 and including pressure control means for moving the center of rotation of said tape supply means and said tape take-up means as tape transport occurs to maintain contact and constant pressure between said tape supply means and said tape take-up means, respectively, and said rim drive belts.

7. A tape transport apparatus according to claim 6 wherein said pressure control means comprises an air cylinder having a piston and piston rod, wherein said air cylinder engages one of said tape supply means and said take-up means and said piston rod cooperating with the other of said tape supply means and said tape take-up means.

8. A tape transport apparatus according to claim 6 wherein said pressure control means comprises a first hanging weight suspended from said tape supply means to urge said tape supply means toward said supply rim drive belt, and a second hanging weight suspended from said tape take-up means to urge said tape take-up means toward said take-up rim drive belt.

9. A tape transport apparatus according to claim 1, and including means for recording a magnetic signal on the tape before it is applied to said take-up means.

* * * * *